(12) United States Patent
Tam et al.

(10) Patent No.: US 7,414,775 B2
(45) Date of Patent: Aug. 19, 2008

(54) CONTRAST ENHANCEMENT IN MULTICHROMAL DISPLAY BY INCORPORATING A HIGHLY ABSORPTIVE LAYER

(75) Inventors: Man C. Tam, Mississauga (CA); Peter M. Kazmaier, Mississauga (CA); Naveen Chopra, Oakville (CA)

(73) Assignee: Xerox Corporation, Norwalk, CT (US)

( * ) Notice: Subject to any disclaimer, the term of this patent is extended or adjusted under 35 U.S.C. 154(b) by 409 days.

(21) Appl. No.: 10/886,425

(22) Filed: Jul. 7, 2004

(65) Prior Publication Data

US 2006/0007525 A1    Jan. 12, 2006

(51) Int. Cl.
G02B 26/00    (2006.01)
G02B 26/08    (2006.01)
G02F 1/29    (2006.01)
G09G 3/34    (2006.01)
G09G 17/04    (2006.01)

(52) U.S. Cl. .................. 359/296; 359/290; 359/291; 359/298; 345/107; 430/32; 430/34

(58) Field of Classification Search ................. 359/296, 359/290, 291, 292, 297, 298; 345/107, 108; 430/32, 34

See application file for complete search history.

(56) References Cited

U.S. PATENT DOCUMENTS

| 5,389,945 | A | 2/1995 | Sheridon |
| 5,754,332 | A | 5/1998 | Crowley |
| 6,055,091 | A * | 4/2000 | Sheridon et al. ............ 359/296 |
| 6,278,482 | B1 * | 8/2001 | Ashizaki ...................... 348/86 |
| 6,383,619 | B1 * | 5/2002 | Engler et al. ................. 428/212 |
| 6,649,318 | B1 * | 11/2003 | Gao et al. .................... 430/138 |
| 6,870,670 | B2 * | 3/2005 | Gehring et al. .............. 359/443 |
| 2001/0009352 | A1 * | 7/2001 | Moore ......................... 313/582 |
| 2002/0113921 | A1 | 8/2002 | Jiang et al. |
| 2003/0025855 | A1 * | 2/2003 | Holman et al. ................ 349/86 |

* cited by examiner

Primary Examiner—Ricky Mack
Assistant Examiner—Brandi N Thomas
(74) Attorney, Agent, or Firm—Pepper Hamilton LLP

(57) ABSTRACT

A display member having improved optical contrast and brightness. The display member includes bichromal capsules, an absorptive layer, an adhesive layer, a substrate and a top layer. The bichromal capsules form a close-packed monolayer configuration positioned on the absorptive layer. The adhesive layer is adjacent to the absorptive layer. The absorptive layer is formed on the substrate. The top layer is formed adjacent the adhesive layer. A method for producing a display member with high optical contrast and brightness. The method includes forming an absorptive layer on a substrate. A close-packed monolayer configuration of bichromal capsules is formed on the absorptive layer by exposing the absorptive layer to a plurality of bichromal capsules. A top layer is formed adjacent the adhesive layer.

18 Claims, 1 Drawing Sheet

CONTRAST ENHANCEMENT IN MULTICHROMAL DISPLAY BY INCORPORATING A HIGHLY ABSORPTIVE LAYER

BACKGROUND OF THE INVENTION

1. Field of the Invention

The description set forth herein generally relates to display members and methods of manufacturing them. More particularly, the description relates to electronic paper-type displays having enhanced contrast and brightness properties.

2. Description of Related Art

Display technologies based on encapsulation of electrophoretic particles, multichromal beads and liquid crystals have many potential applications in fields such as digital document media, for example, electronic paper. High brightness and high contrast are two of the main performance requirements for digital document media applications.

In particular, bichromal displays have numerous advantages over conventional electrically addressable visual displays, such as LCD and CRT displays. In particular, they are suitable for viewing in ambient light, retain an image indefinitely in the absence of an applied electric field, and can be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reuseable (and thus environmentally friendly) substitute for ordinary paper. For further advantages of the bichromal display, see U.S. Pat. No. 5,389,945, which is herein incorporated by reference.

Although bichromal displays promise to offer many of the advantages of ordinary paper together with the advantages of electrically addressable displays, the bichromal displays can be improved. For example, some displays do not look as good as paper. In particular, they may not have the high white reflectance of paper (typically 85% diffuse reflectance for white paper). Consequently, they do not have the high brightness and contrast characteristics of ordinary white paper.

Typically a way to improve the white reflectance of a bichromal display is to make the display from a thick arrangement of bichromal balls. It is thought that the thicker the arrangement of balls, the better the reflectance and the brighter the appearance of the display. The analogy here is to ordinary paint: other things being equal, a thicker coat of white paint reflects more incident light than a thinner coat of paint, and therefore appears brighter and whiter than the thinner coat. By analogy, it is expected that a thick arrangement of bichromal balls will tend to reflect more incident light than a thinner arrangement. In particular, the white faces of bichromal balls located at some distance below the viewing surface of the display are expected to reflect any light that is not reflected by balls located nearest the surface.

It is also thought that to achieve high resolution in a bichromal display, the cavities in which the balls rotate should be packed as closely together as possible. However, it is conventionally supposed that the size of the balls within the cavities is of no consequence insofar as display reflectance is concerned. That is because in a display having a thick arrangement of bichromal balls, the balls located farther from the viewing surface of the bichromal display will "fill in the gaps" between bichromal balls located nearer the viewing surface. In other words, so long as the two-dimensional projection of the balls at all distances from the viewing surface onto the viewing surface substantially covers the viewing surface, a high-quality display will be obtained.

However, the display manufacturing techniques described above may result in a thick display, which has certain drawbacks. Notably, a thicker display, requires a higher drive voltage. Nevertheless, virtually all known bichromal displays are made with thick arrangements of bichromal balls (such as sheets of bichromal balls wherein the sheets are several ball diameters thick), because this is thought to be necessary in order to produce displays of adequate brightness.

Additionally, current multichromal display devices are produced by the "swollen sheet" method. In this method bare bichromal beads, randomly mixed and dispersed in a silicone elastomeric sheet, are rendered rotatable by swelling the elastomer in silicone oil. Pockets of oil form around each bead, and the beads detach from the elastomer-bead interface. However this method has many shortcomings including a relatively low white reflectance which yields low brightness, low contrast and a high switching voltage threshold, which results from the thicker multi-layered structure of the randomly dispersed beads.

Accordingly, a need exists for a display device that is capable of achieving high optical contrast, high brightness and low switching voltage and a method of manufacturing thereof.

SUMMARY

An embodiment is generally directed to a display member having improved optical contrast, improved brightness and low switching voltage. The display member may include bichromal capsules (for example, beads, cylinders or other particles inside an oil-filled capsule), and absorptive layer, an adhesive layer, a substrate and a top layer. In an embodiment, the bichromal capsules form a close-packed monolayer configuration on the absorptive layer. The adhesive layer may be adjacent to the absorptive layer. The absorptive layer may be formed on the substrate. The top layer may be formed adjacent the adhesive layer.

The absorptive layer may be both absorptive and adhesive. Alternatively, there may be a separate absorptive layer and a separate adhesive layer. The adhesive layer is preferably transparent. The absorptive layer may also include black pigments dispersed in a polymeric binder and preferably has a thickness of about 1.0-20 microns. The display member may further include an adhesive layer with the bichromal capsules embedded within the adhesive layer and the adhesive layer formed atop the absorptive layer. The bichromal capsules are preferably black and white and may be electrophoretic particles. The substrate may be paper or a conducting element. The top layer is preferably transparent.

Another embodiment, is generally related to a method for producing a display member with improved optical contrast and brightness. An absorptive layer is formed on a substrate. A close-packed monolayer configuration of bichromal capsules is then formed on the absorptive layer by exposing the absorptive layer to a plurality of bichromal capsules. Finally, a top layer is formed adjacent the adhesive layer.

The method may include the steps of forming an adhesive layer atop the absorptive layer and embedding the bichromal capsules within the adhesive layer. The method may also include the steps of forming the close-packed monolayer by cascading the bichromal capsules onto the absorptive layer and forming an adhesive layer on the absorptive layer. The absorptive layer may also be an adhesive layer. The adhesive layer is preferably transparent. The absorptive layer may also include black pigments dispersed in a polymeric binder. The absorptive layer preferably has a thickness of about 1.0-20 microns. The substrate may be paper or a conducting element. The bichromal capsules may be electrophoretic particles.

Yet another embodiment is generally directed to an electronic paper having improved optical contrast and brightness. The electronic paper includes bichromal capsules, an absorptive layer, an adhesive layer, a substrate and a top layer. The bichromal capsules are in a close-packed monolayer configuration in the absorptive layer. The adhesive layer is formed adjacent the absorptive layer. The absorptive layer is formed on the substrate. The top layer is formed adjacent the adhesive layer.

DETAILED DESCRIPTION

The invention is generally directed to display members and methods of manufacturing them. In an embodiment, a display member such as electronic paper has higher optical contrast and brightness and low switching voltage.

Figure 1:
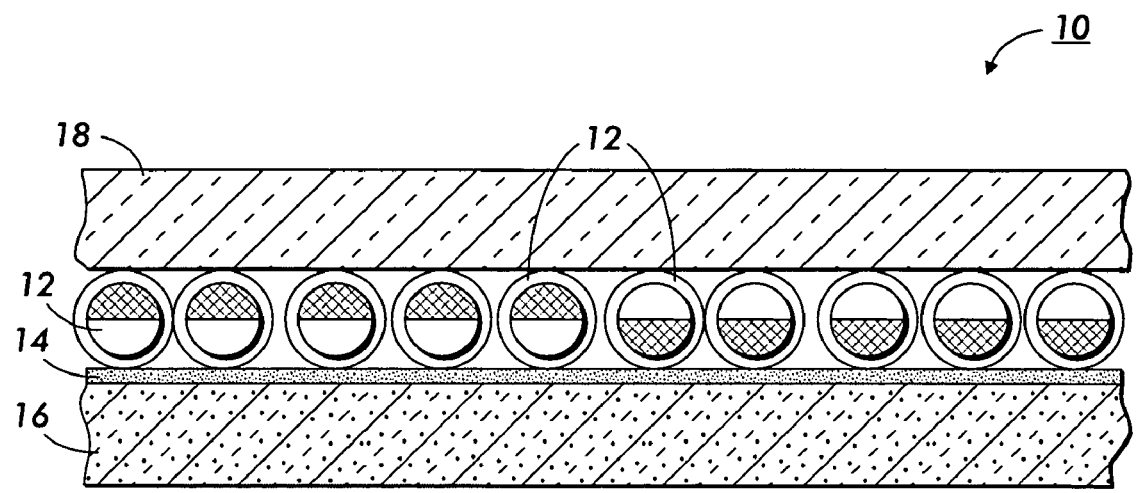
FIG. 1 is a schematic diagram of a display member in accordance with an embodiment.

FIG. 1 illustrates a display member 10 according to one embodiment of the invention. The display member 10 includes multichromal or bichromal capsules 12, an absorptive layer 14, a substrate 16 and a top layer 18. The bichromal capsules 12 form a close-packed monolayer configuration on the absorptive layer 14 as described in more detail hereinafter.

The bichromal capsules 12 may be or may contain any bichromal or multichromal display materials such as bichromal beads, electrophoretic particles, twisting cylinders and the like. The size of the bichromal capsules is preferably substantially uniform and are one color, such as white, on one hemispherical surface and a different color, such as black, on the other surface. Of course, multichromal capsules may have different configurations. For signage applications, the diameter of the bichromal capsules may be approximately 100 µm. Of course, other capsule sizes are possible in any of the embodiments described herein.

The bichromal capsules 12 form a close-packed monolayer configuration on the absorptive layer 14. The close-packed monolayer configuration minimizes absorption of the scattered light by the black hemispheres, resulting in substantial improvement in brightness and optical contrast. In particular, the absorptive layer 14 is exposed to a plurality of bichromal capsules 12 until a close-packed monolayer configuration is achieved as illustrated in FIG. 1. In the monolayer configuration of the bichromal capsules 12 on the absorptive layer 14 the bichromal capsules 12 may be adjacent to each other including at least a portion of the surfaces of neighboring capsules touching each other. Preferably, the maximum separation distance between the bichromal capsules 12 on the absorptive layer 14 is less than the diameter of a single bichromal capsule 12.

The monolayer configuration of being close-packed can be defined by the amount of incident light that is transmitted through the monolayer configuration by measuring the transmission optical contrast density. Transmission optical density $D_T$ is represented by the formula:

$$D_T = \log_{10}(I_0/I)$$

where I is the transmitted light intensity and $I_0$ is the incident light intensity. Transmission optical contrast density is given by the difference between the optical densities of the monolayer of bichromal balls coated on the substrate and that of the substrate alone. The transmission optical contrast density obtained by coating a monolayer of bichromal balls on an adhesive polyester substrate in accordance with the invention is in the range of about 0.40-0.70, allowing only about 20-40% of incident light to transmit through the monolayer. Preferably, only less than about 30% of incident light is allowed to transmit when using the close-packed monolayer configuration as described herein. For bichromal balls encapsulated inside capsules, the amount of light that can transmit through the monolayer is preferably less than about 40%.

The absorptive layer 14 includes adhesive properties. These adhesive properties allow the absorptive layer 14 to function to retain and/or maintain the bichromal capsules 12 in position. The absorptive layer 14 then functions to absorb light rays that pass through the interstices of the bichromal capsules 12 without being reflected back to an observer. This results in a decrease in reflectance. However the effect of the absorptive layer is greatly different for the black (low reflectance) and white (high reflectance) regions of the displayed image The reflectance in the black (low reflectance) region is greatly reduced compared with only a slight decrease in the white (high reflectance) region yielding a substantial increase in optical contrast. The slight decrease in reflectance observed in the white (high reflectance) region means that almost all the light rays that pass through the interstices of the bichromal capsules are lost (by absorption either by the black side of the capsules or by the substrate) with little dependence on whether the substrate is reflective or absorptive.

The absorptive layer 14 may have any thickness, although in an embodiment the thickness may be in the range of 1.0-20 microns. In another embodiment, the absorptive layer may include black pigments dispersed in a polymeric binder, as such a binder may provide additional adhesive properties.

The absorptive layer 14 is formed on or deposited on the substrate 16. The top layer 18 is formed atop the bichromal capsules 12. The substrate 16, may be made of paper, a conducting substrate such as ITO glass/polymeric film, and the like. Substrate 16 may also be made of paper or a conducting substrate, or a transparent material such as plastic or glass. At least one of the substrate 16 or top layer 18 is transparent.

Figure 2:
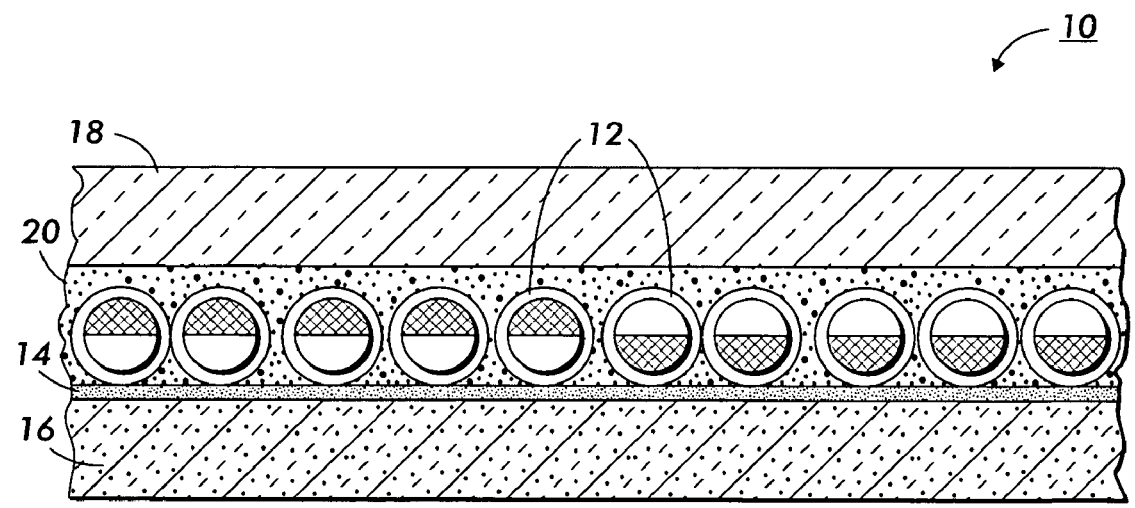
FIG. 2 is a schematic diagram of a display member in accordance with another embodiment.

Another embodiment is illustrated in FIG. 2. In FIG. 2, the display member 10 includes bichromal capsules 12, absorptive layer 14, substrate 16, top layer 18 and an adhesive layer 20 which is then located adjacent the absorptive layer 14. In this embodiment, the bichromal capsules 12 are partially or fully embedded in the adhesive layer 20. The adhesive layer 20 functions to facilitate formation of the close-packed monolayer by fixing the bichromal capsules 12 in place once they come into contact with the adhesive layer 20. In particular, the adhesive layer 20 further fixes the bichromal capsules 12 in position and adds mechanical robustness to the system. Adhesive layer 20 is preferably transparent.

Accordingly, the absorptive and adhesive properties of the layer may be provided by a single absorptive layer or by two separate layers including a transparent adhesive layer and an absorptive layer. Examples of materials that may be utilized as adhesives include thermoplastic and thermosetting adhesives such as copolymers of styrene and acrylate, polyester resins, polyurethane, copolymers of acrylonitride and vinylidene chloride, polyvinyl butyral, polyolefins or epoxy and the like.

Another embodiment, is directed to an electronic paper having high optical contrast and brightness. The electronic paper includes bichromal capsules, an absorptive layer, an adhesive layer, a substrate and a top layer. The bichromal capsules are embedded in a close-packed monolayer configuration within the absorptive layer. The adhesive layer is formed adjacent the absorptive layer. The absorptive layer is formed on the substrate and the top layer is formed adjacent the adhesive layer.

Yet another embodiment is directed to a method for producing display devices with higher optical contrast and brightness. Absorptive layer 14 is formed on a substrate 16. A close-packed monolayer configuration of bichromal capsules 12 is then formed on the absorptive layer 14 by exposing the absorptive layer 14 to a plurality of bichromal capsules 12. The absorptive layer 14 may be exposed to a plurality of bichromal capsules 12 by pouring a plurality of bichromal capsule 12 over the absorptive layer 14 until a close-packed monolayer configuration of bichromal capsules 12 is achieved. Preferably the bichromal capsules 12 are adjacent to each other with a maximum separation distance being a diameter of bichromal capsule 12. A top layer 18 is finally formed adjacent the adhesive layer 20.

The method may include the steps of partially or fully embedding the bichromal capsules within an adhesive layer and forming the adhesive layer atop the absorptive layer. The absorptive layer may be an adhesive layer. The adhesive layer is preferably transparent. The absorptive layer may also include black pigments dispersed in a polymeric binder. The absorptive layer preferably has a thickness of about 1.0-20 microns. The bichromal capsules are preferably black and white. The substrate may be paper or a conducting element with at least the substrate or top layer being transparent.

The examples below are merely representative of the work that contributes to the teaching of the present invention and is not to be restricted by the examples that follow.

EXAMPLE 1 a highly absorptive black layer was produced by depositing a toner layer on xerographic white paper. The optical reflectances for the black layer and the white paper were respectively about 1% and 85%. A thin transparent adhesive layer was formed by spraying onto the toner layer and white paper substrate. Capsules of bichromal (black and white) beads, approximately 125-150 µm in diameter, were then cascaded over the adhesive surface several times to yield a close-packed monolayer. The structure was then sandwiched between two ITO coated glass electrodes and the optical reflectance was measured.

The results illustrate that by using a highly absorptive black background, the optical contrast ratio could be enhanced from 1.3 to 2.

EXAMPLE 2

The optical contrast that a display device incorporating a highly absorptive layer is potentially capable of providing was determined. To simulate the optical effects of bichromal beads having perfect complementarily and bichromality, i.e. exactly half black and half white, devices were fabricated by coating respectively a close-packed monolayer of bare monochromal black beads (approximately 100 µm in diameter) and bare monochromal white beads (approximately 100 µm in diameter) onto a highly absorptive black substrate (black toner layer) as well as a highly reflective white substrate (white paper). The devices were then sandwiched between ITO (indium-tin-oxide) coated glasses and the optical density was measured.

With the white substrate, a high reflectance ~56% was obtained, which decreased only slightly to ~43% for the black substrate. However, the contrast ratio was greatly increased from 14 for the white substrate to 28 for the black substrate.

EXAMPLE 3

A highly absorptive black layer was produced by depositing a toner layer on xerographic white paper. The optical reflectance for the black layer and the white paper was respectively about 1% and 85%. A thin transparent adhesive layer was formed by spraying onto the toner layer and the white paper substrate. Capsules (approximately 212-300 µm in diameter) containing white electrophoretic pigment particles of $TiO_2$/polymer dispersed in a dyed dielectric fluid (0.2% Oil Blue N and 0.2% Sudan Red in Isopar M) were then cascaded over the adhesive surface several times to yield a close-packed monolayer. The structure was then sandwiched between two ITO coated glass electrodes and the optical reflectance was measured.

The results showed that by using a highly absorptive black background, the optical contrast ratio could be substantially enhanced (from about 1.5 to about 3).

While the present invention is satisfied by embodiments in many different forms, there is shown in the drawings and described herein in detail, the preferred embodiments of the invention, with the understanding that the present disclosure is to be considered as exemplary of the principles of the invention and is not intended to limit the invention to the embodiments illustrated. Various other embodiments will be apparent to and readily made by those skilled in the art without departing from the scope and spirit of the invention. The scope of the invention will be measured by the appended claims and their equivalents.

What is claimed is:

1. A display member having improved optical contrast and brightness, comprising:
    an absorptive layer formed on a substrate;
    bichromal capsules in a single close-packed monolayer configuration positioned on the absorptive layer, wherein the bichromal capsules respond to an electric field and wherein the bichromal capsules comprise at least one bichromal bead or cylinder;
    a top layer formed atop the bichromal capsules and opposite the absorptive layer; and
    an adhesive layer intermediate the absorptive layer and the top layer.

2. The display member according to claim 1, wherein the adhesive layer is integral with the absorptive layer.

3. The display member according to claim 2, wherein the adhesive layer is transparent.

4. The display member according to claim 1, wherein the bichromal capsules embedded within the adhesive layer and the adhesive layer is formed atop the absorptive layer.

5. The display member according to claim 1, wherein the absorptive layer further comprises black pigments dispersed in a polymeric binder.

6. The display member according to claim 1, wherein the absorptive layer has a thickness of about 1.0-20 microns.

7. The display member according to claim 1, wherein the top layer is transparent.

8. The display member according to claim 1, wherein the substrate is paper or a conducting element.

9. The display member according to claim 1, wherein the bichromal capsules are electrophoretic particles.

10. A method for producing a display member with improved optical contrast and brightness, comprising:

forming an absorptive layer on a substrate;

forming an adhesive layer intermediate the absorptive layer and a top layer;

forming a single close-packed monolayer configuration of bichromal capsules on the absorptive layer by exposing the absorptive layer to a plurality of bichromal capsules, wherein the bichromal capsules responds to an electric field and wherein each bichromal capsule comprises at least one bichromal bead or cylinder; and providing the top layer adjacent the absorptive layer.

11. The method for producing a display member according to claim 10, further comprising the step of embedding the bichromal capsules within the adhesive layer.

12. The method for producing a display member according to claim 10, further comprising the step of forming the close-packed monolayer is performed by cascading the bichromal capsules onto the absorptive layer and forming an adhesive layer on the absorptive layer.

13. The method for producing a display member according to claim 10, wherein the absorptive layer is an absorptive and an adhesive layer.

14. The method for producing a display member according to claim 11, wherein the adhesive layer is transparent.

15. The method for producing a display member according to claim 10, wherein the absorptive layer further comprises black pigments dispersed in a polymeric binder.

16. The method for producing a display member according to claim 10, wherein the absorptive layer has a thickness of about 1.0-20 microns.

17. The method for producing a display member according to claim 10, wherein the substrate is paper or a conducting element.

18. The method for producing a display member according to claim 10, wherein the bichromal capsules are electrophoretic particles.

* * * * *